Oct. 20, 1970  B. J. FRAZIER ET AL  3,534,939

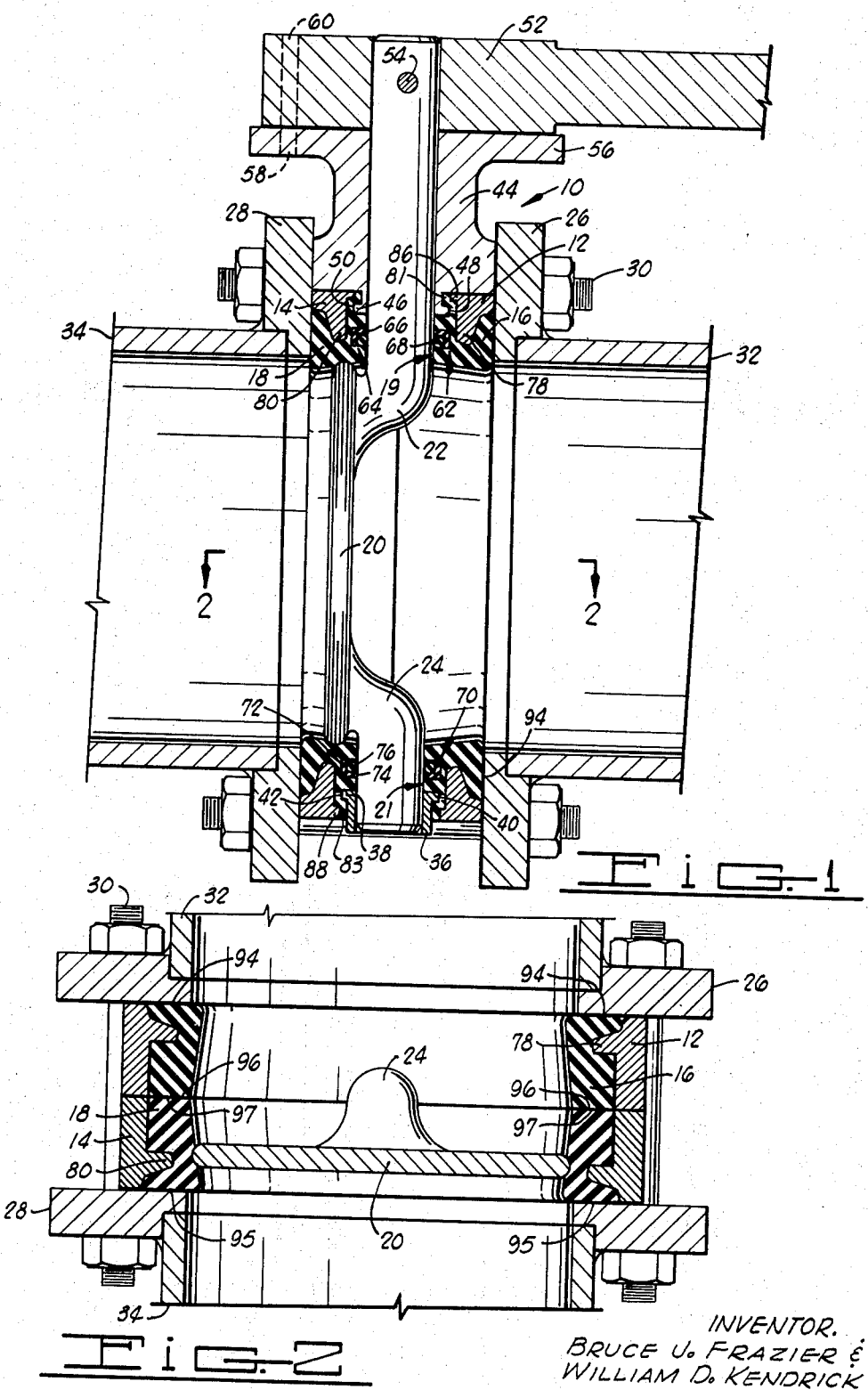

BUTTERFLY VALVE

Filed Dec. 24, 1968  3 Sheets-Sheet 2

INVENTOR.
BRUCE J. FRAZIER &
WILLIAM D. KENDRICK
BY
ATTORNEYS

INVENTOR.
BRUCE J. FRAZIER &
WILLIAM D. KENDRICK

United States Patent Office 3,534,939
Patented Oct. 20, 1970

3,534,939
BUTTERFLY VALVE
Bruce J. Frazier and William D. Kendrick, Duncan, Okla., assignors to Halliburton Company, Duncan, Okla., a corporation of Delaware
Filed Dec. 24, 1968, Ser. No. 786,658
Int. Cl. F16k 1/22
U.S. Cl. 251—306      6 Claims

ABSTRACT OF THE DISCLOSURE

A butterfly valve having an offset disc and having two tubular body members with two identical seating surfaces neither of which coincide with the center line of the valve. In certain applications the valve may be installed utilizing only one body member.

BACKGROUND OF THE INVENTION

Field of the invention

This invention relates generally to improvements in valves, and more particularly, but not by way of limitation, to an improved butterfly valve having offset disc closure and seating means.

Description of the prior art

Butterfly values are well known and are superior to other types of valves in many applications due to their economy of construction, simplicity and dependability. A highly successful type of butterfly valve includes the arrangement wherein a disc closure member having a substantially 360 degree sealing periphery engages a resilient liner placed in the valve body. Typically, the resilient liner is slidably positioned within a single valve body with seating of the disc closure member taking place at the center line of the body. Ordinarily the valve body is adaptable to receive flanges at each end which are held in place by bolts or studs so that the resilient seat is supported within the body.

A problem which has characterized these prior valves is that when they are in the closed position fluid pressures or vacuum forces exerted on the valves are also exerted on the valve stem or sealing means between the valve body and the valve stems causing leakage to occur.

Another problem of these prior valves is that the disc closure member and the stems must be made in two or more parts in order to allow replacement of the linear. That is, the stems must be removed from the disc closure member before the disc closure member can be removed from the valve body and before the liner can be removed and replaced. Thus, many separate machine parts are required causing the valves to be relatively costly to manufacture.

Still another problem of these prior valves is that only one seating surface is provided and once it wears out the valve must be taken out of service and the entire liner replaced.

SUMMARY OF THE INVENTION

The present invention relates a butterfly valve comprising a pair of tubular members, each having a pair of aligned transverse slots in one end, said members being fitted together with said slots adjacent one another to form a tubular body having a pair of aligned openings in opposite sides thereof. A pair of elastomer liners each secured around the inner periphery of one of the tubular members and having opposite portions thereof extending into the openings in said body are provided. The opposite portions of each of the liners include transverse slots therein so that a pair of opposite aligned openings are formed by the liners within the openings in the body. A disc closure member is supported in the body by a pair of stems integrally attached thereto and journaled in the aligned openings formed by the liners. The disc closure member is positioned with respect to the stems in a plane parallel to the axes of the stems, but offset therefrom so that the entire outer periphery of the disc closure member is sealed by one of the liners when the disc closure member is positioned transversely across the body between the valve stems and either end of the body. Means are provided attached to one of the valve stems for turning the valve stems and the disc closure member to a desired position.

It is, therefore, a general object of this invention to provide an improved butterfly valve.

Another object of this invention is the provision of a butterfly valve including a disc closure member which seals against a seating surface in an offset position parallel with the axes of said stems thereby preventing pressure or vacuum forces from being exerted on the stems or stem sealing means when said disc closure member is in a closed position and said forces are exerted on the valve from one direction.

Yet another object of the present invention is the provision of a butterfly valve which may include valve stems and disc closure member which are of one-piece construction.

Still another object of the present invention is the provision of a butterfly valve wherein the liner may be simply removed without dismantleing the disc closure member and stems.

A further object of the present invention is the provision of a butterfly valve including a minimum number of parts which are relatively inexpensive to produce.

A still further object of the present invention is to provide a butterfly valve including two identical seating surfaces so that if one wears out the other may be used without the necessity of dismantleing the valve and replacing the liner.

Other and further objects, features and advantages of the invention will be apparent from the following detailed description when read in conjunction with the accompanying drawings which illustrate the invention.

DESCRIPTION OF THE DRAWINGS

FIG. 1 is a cross-sectional view of the valve of the present invention installed between flanges and pipe sections.

FIG. 2 is a cross-sectional view taken along lines 2—2 of FIG. 1.

DESCRIPTION OF THE PREFERRED EMBODIMENT

Figure 3:
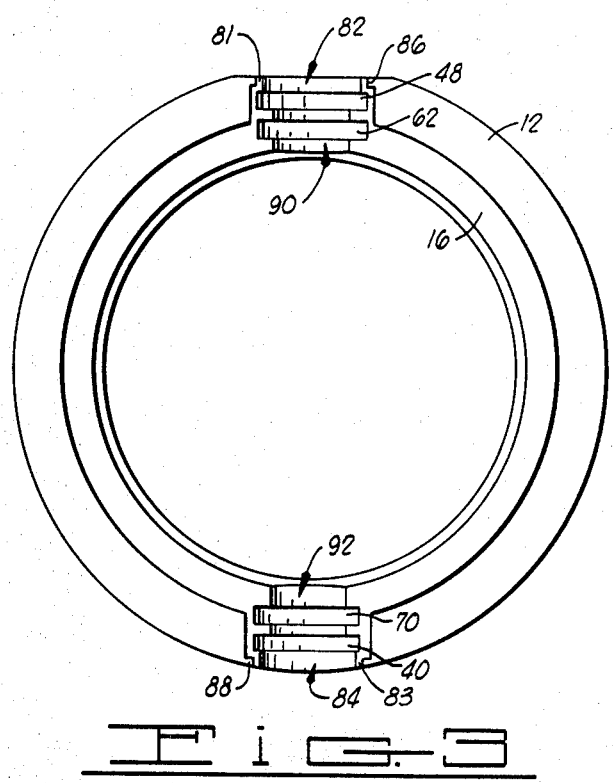
FIG. 3 is a side view of a body member of the present invention with a resilient liner positioned therein.

Referring now to the drawings, and particularly to FIGS. 1 and 2, the numeral 10 indicates a valve of this invention shown in cross-section. The valve consists basically of two tubular members 12 and 14 positioned adjacent one another to form a tubular body. Secured within tubular member 12 is an elastomer line 16 and secured within tubular member 14 is a second elastomer liner 18. Each of members 12 and 14 and liners 16 and 18 include transverse semicircular slots positioned adjacent one another forming a pair of aligned openings 19 and 21. Disc closure member 20 is supported within the valve 10 by offset stems 22 and 24 which are journaled in openings 19 and 21. Members 12 and 14 and liners 16 and 18 are held together by clamping members or flanges 26 and 28, which may be of conventional construction, such as those used in connecting lengths of pipe to form a flow line, and which may be secured together in clamping relation to said members and liners in any convenient manner, as by means of studs 30. Pipe sections 32 and 34 are shown welded to flange members 26 and 28.

A bearing member or sleeve 36 is concentrically positioned over the lower portion of stem 24 and is held between liners 16 and 18 by tubular members 12 and 14. Bearing member 36 includes an annular flange portion 38 which fits into annular groove 40 in liner 16 and annular groove 42 in liner 18 thereby preventing its movement in a direction parallel with the axis of stem 24. Bearing member or sleeve 44 is concentrically positioned over a lower portion of stem 22 and is also held between liners 16 and 18 by body members 12 and 14. Bearing member 44 includes an annular flange portion 46 which fits into annular groove 48 in liner 16 and annular groove 50 in liner 18 thereby preventing its movement parallel to the axis of stem 22.

Handle 52 is attached to the upper portion of stem 22 by means of pin 54 thereby providing means for turning stem 22 and disc closure member 20 between opened and closed positions.

Bearing member 44 may include means for locking handle 52 in a selected position such as by annular flange portion 56 which may contain a plurality of apertures 58 near its periphery. Handle 52 may contain an aperture 60 which coincides with apertures 58 and a pin or lock may be placed through aperture 60 and one of apertures 58 in order to secure handle 52 in a desired position.

Liners 16 and 18 include grooves 62 and 64 in opening 19. Grooves 62 and 64 preferably each have two sides perpendicular to the axis of stem 22 and a bottom surface parallel with the axis of stem 22. A backup ring 66, preferably L-shaped in cross-section is positioned in grooves 62 and 64 with one leg in contact with the bottom surface of grooves 62 and 64 and the other leg in contact with the sides of grooves 62 and 64 which face inwardly. O-ring 68, having a substantially circular cross-section, is also disposed within grooves 62 and 64 so that a seal is formed between stem 22 and backup ring 66. Backup ring 66 in turn seals against liners 16 and 18.

Liners 16 and 18 further include grooves 70 and 72 in openings 21. Grooves 70 and 72 are of identical size as grooves 62 and 64 and preferably each have two sides perpendicular to the axis of stem 24 and a bottom surface parallel with the axis of the stem. A backup ring 74, identical to backup ring 66, preferably L-shaped in cross-section, is positioned in grooves 70 and 72 with one leg in contact with the bottom surface of grooves 70 and 72 and with the other leg in contact with the sides of grooves 70 and 72 which face inwardly. O-ring 76, identical with O-ring 66 and of substantially circular shape in cross-section, is disposed within grooves 70 and 72 so that a seal is formed between stem 24 and backup ring 74. Backup ring 74 in turn seals against liners 16 and 18.

Tubular members 12 and 14 include inwardly extending annular flange portions 78 and 80 which matingly engage liners 16 and 18 around their entire outer peripheries. Flange portions 78 and 80 serve to secure liners 16 and 18 and prevent their movement in a direction parallel to the axes of tubular members 12 and 14.

Disc closure member 20 is supported in tubular members 12 and 14 by stems 22 and 24 in a plane parallel with, but offset from the axis of said stems. Disc closure member 20 seals against the inner periphery either of liners 16 or 18 around the entire outer periphery of disc closure member 20 when positioned transversely across the body formed by tubular members 12 and 14 between the axes of the stems and either end of the body.

Figure 4:
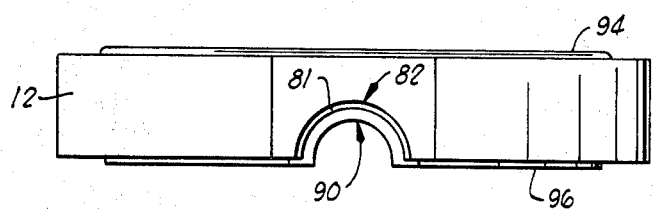
FIG. 4 is a top view of the body member and liner of FIG. 3.

The tubular members 12 and 14 and elastomer liners 16 and 18 shown in FIGS. 1 and 2 may be identical. So that a clear understanding of these parts is presented herein, tubular member 12 with elastomer liner 16 secured therein is shown in FIGS. 3 and 4. It is to be understood that the following description of tubular member 12 and liner 16 applies equally to tubular member 16 and liner 18.

Referring then to FIGS. 3 and 4, tubular member 12 includes a pair of aligned slots 82 and 84 in one end which are semicircular in cross-section. A lip 86 extends inwardly at the outer end of slot 82, and a lip 88 extends inwardly at the outer end of slot 84. A portion 81 of liner 16 extends into slot 82 and a portion 83 of liner 16 extends into slot 84. Lips 86 and 88 serve to provide support for portions 81 and 83 of liner 16 and to prevent outward movement of portions 81 and 83 of liner 16 in directions parallel to slots 82 and 84. Additionally, lips 86 and 88 serve to hold bearing members 36 and 44 (FIG. 1) in place.

Elastomer liner 16 includes a pair of aligned transverse slots 90 and 92 of substantially semicircular shape which are positioned adjacent to slots 82 and 84 in tubular member 12. Slots 90 includes semi-annular grooves 62 and 48 mentioned above. Slot 92 includes semi-annular grooves 70 and 40 mentioned above.

When tubular members 12 and 14 and liners 16 and 18 are clamped together in the position illustrated in FIGS. 1 and 2, slots 82 and 84 in tubular member 12 and slots 90 and 92 in liner 16 lie adjacent to like slots in tubular member 14 and liner 18 forming openings 19 and 21 described above. Similarly, semi-annular grooves 62 and 70 in liner 16 lie opposite like grooves 64 and 72 in liner 18 forming substantinally annular grooves for receiving backup rings 66 and 74 and O-rings 68 and 76. Also, semi-annular grooves 48 and 40 in liner 16 lie adjacent to like grooves 50 and 42 in liner 18 forming substantially annular grooves for receiving annular flange portion 46 of bearing member 44, and annular flange portion 38 of bearing member 36.

As illustrated in FIG. 4 liner 16 extends beyond the ends of tubular member 12 thereby presenting sealing surfaces 94 and 96. Liner 18 also extends beyond the ends of tubular member 18 presenting like sealing surfaces 95 and 97 (FIGS. 1 and 2). When clamped together as shown in FIGS. 1 and 2 sealing surface 94 of liner 16 is compressed against flange 26 forming a fluid-tight seal between liner 16 and flange 26, and sealing surface 95 is compressed against flange 28 forming a fluid-tight seal therebetween. Sealing surfaces 96 and 97 of liners 16 and 18 are compressed together in a like manner providing a fluid-tight seal between liners 16 and 18. Sealing surfaces 94 and 95 may be in the form of a bead or annulet if desired.

OPERATION AND CONSTRUCTION

Liners 16 and 18 may be bonded to tubular members 12 and 14 to form integral body members if desired, and liners 16 and 18 may be efficiently formed by molding elastomer material directly into tubular body members 12 and 14.

Disc closure member 20 is shown in FIGS. 1 and 2 in a closed position with disc closure member 20 positioned transversely across tubular member 14 and seated around its entire periphery against liner 18 at a point between the axes of stems 22 and 24 and one end of member 14. A second closed position may be achieved by rotating disc closure member 20 180 degrees so that disc closure member 20 is positioned transversely across tubular member 12 and is seated around its entire periphery against liner 16 at a point between the axes of stems 22 and 24 and one end of tubular member 12. Thus, if pressure or vacuum forces are exerted on valve 10 through pipe section 34, valve 10 may be closed with disc closure member 20 in the position illustrated in FIG. 1 thereby preventing said forces, and the fluid being controlled by valve 10, from reaching O-rings 68 or 76. In the event pressure or vacuum forces are exerted on valve 10 from the other direction, that is through pipe section 32, disc closure member 20 may be turned to the second closed position described above thereby again preventing the forces and fluid being controlled by valve 10 from being exerted on O-rings 68 and 76. Thus, the valve of the present invention may always be closed in a position to bring about the least force or pressure differential on the valve stem sealing means thereby increasing the life of the sealing means and preventing leakage from occurring. In addition, by the provision of two seating surfaces the service life of the valve of the present invention is increased appreciably over conventional butterfly valves having only one seating surface.

By the provision of two tubular body members which part at the center line of the valve of the present invention all of the parts of the valve may be readily removed and replaced. That is, in order to completely dismantle the valve it is only necessary to remove studs 30 and flange members 26 and 28. Tubular members 12 and 14 and liners 16 and 18 may then be parted and bearing sleeves 36 and 44 removed from stems 22 and 24. New bearing sleeves, back-up rings or O-rings may then be readily replaced if desired. Also, either tubular member and elastomer liner may be replaced with a minimum of effort.

Additionally, by the provision of two tubular members and elastomer liners parting at the center line of the valve of the present invention, disc closure member 20 and stems 22 and 24 may be of integral or one-piece construction and the liners and other parts of the valve may still be readily removed.

ALTERNATE FORM OF THE INVENTION

Figure 5:
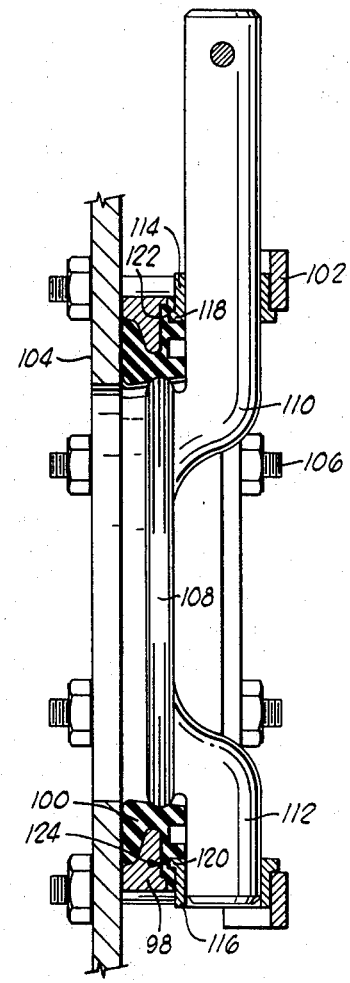
FIG. 5 is a cross-sectional view of an alternate form of the present invention installed as a tank outlet valve.
Figure 6:
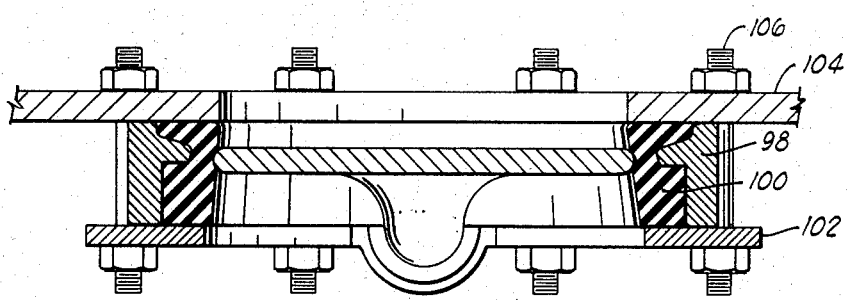
FIG. 6 is a cross-sectional view taken along lines 6—6 of FIG. 5.

Referring now to FIGS. 5 and 6 an alternate form of the valve of the present invention is shown which may be used in applications where pressure or vacuum forces are exerted on one side of the valve only. An example of such an application is where the valve is used as a drain valve on a tank. One tubular member 98, identical to tubular members 12 and 14 described above, having an elastomer liner 100 secured therein, identical to liners 16 and 18 described above, may be used with a special mounting flange 102. Mounting flange 102 includes a plurality of apertures near its periphery and is secured to a tank wall 104 by means of studs 106 which extend through said apertures and through adjacent apertures in tank wall 104. Disc closure member 108 is supported within tubular member 98 by stems 110 and 112. Stems 110 and 112 are rotatably secured in aligned seats of semi-circular cross-section in liner 100 by means of bearing members 114 and 116. Bearing members 114 and 116 are in turn rigidly held between body member 98 and mounting flange 102 by studs 106. Bearing members 114 and 116 include annular flange portions 118 and 120, a portion of which fit into grooves 122 and 124 in liner 100, thereby preventing movement of bearing members 114 and 116 in directions parallel to the axes of stems 110 and 112. Disc closure member 108 is supported by stems 110 and 112 in a plane parallel with, but offset from, the axes of said stems. Disc closure member 108 seals against liner 100 around the entire outer periphery of disc closure member 108 at a point between the axes of said stems and the opposite end of tubular member 98 when in a closed position. A handle, not shown, may be attached to the outer portion of stem 110 for pivoting closure member 108 between opened and closed positions. No stem sealing means are required since pressure of vacuum forces exerted on the valve are not transmitted past the point at which disc closure member 108 engages liner 100 when in the closed position.

The present invention, therefore, is well adapted to carry out the objects and obtain the ends and advantages mentioned as well as others inherent therein. While presently preferred embodiments of the invention are given for the purpose of disclosure, numerous changes in detail of the construction and arrangement of parts can be made which will readily suggest themselves to those skilled in the art and which are encompassed within the spirit of the invention disclosed herein.

What is claimed is:
1. A butterfly valve comprising:
   a pair of tubular members, each having a pair of aligned transverse slots in one end, said members being fitted together with said slots adjacent one another to form a tubular body having a pair of aligned openings in opposite sides thereof;
   a pair of elastomer liners, each secured around the inner periphery of one of said tubular members and having opposite portions thereof extending into the openings in said body, said opposite portions of each of said liners including transverse slots therein so that a pair of opposite aligned openings are formed by said liners within the openings in said body;
   a disc closure member supported in the body by a pair of stems integrally attached thereto and journaled in the aligned openings formed by said liners, said disc closure member being positioned with respect to said stems in a plane parallel to the axes of said stems but offset therefrom so that the entire outer periphery of the disc closure member is sealed by one of the liners when the disc closure member is positioned transversely across the body between the axes of the stems and either end of the body;
   means attached to one of said stems for turning the stems and disc closure member to a desired position.
2. The valve of claim 1 which is further characterized to include bearing means positioned on said stems and secured in the aligned openings formed by said liners.
3. The valve of claim 2 wherein said bearing means are cylindrically shaped sleeves.
4. The valve of claim 3 which is further characterized to include seal forming means between said stems and said elastomer liners.
5. The valve of claim 4 wherein said seal forming means include:
   each of said elastomer liners having semi-annular grooves disposed in the transverse slots thereof so that substantially annular grooves are formed in each of the openings formed by said liners; and
   an O-ring of substantially circular shape in cross-section disposed in each of said annular grooves for sealingly engaging said stems and said elastomer liners.
6. The valve of claim 5 which is further characterized to include backup rings disposed in said annular grooves between said O-rings and said elastomer liners.

References Cited

UNITED STATES PATENTS

| | | | |
|---|---|---|---|
| 3,048,363 | 8/1962 | Garrigan | 251—307 |
| 3,124,334 | 3/1964 | Szohatzky | 251—315 XR |
| 3,143,132 | 8/1964 | Pangburn | 251—306 XR |
| 3,284,045 | 11/1966 | Kulisek | 251—315 |
| 3,290,001 | 12/1966 | Taylor | 251—306 XR |

FOREIGN PATENTS

| | | |
|---|---|---|
| 746,909 | 3/1956 | Great Britain. |

HENRY T. KLINKSIEK, Primary Examiner